(12) United States Patent
MacInnis (10) Patent No.: US 7,092,831 B2
(45) Date of Patent: Aug. 15, 2006

(54) SYSTEM AND METHOD FOR DETERMINING SIGNAL CONSISTENCY

(75) Inventor: Alexander G. MacInnis, Lake Oswego, OR (US)

(73) Assignee: Broadcom Corporation, Irvine, CA (US)

( * ) Notice: Subject to any disclaimer, the term of this patent is extended or adjusted under 35 U.S.C. 154(b) by 192 days.

(21) Appl. No.: 10/884,905

(22) Filed: Jul. 6, 2004

(65) Prior Publication Data

US 2006/0009934 A1    Jan. 12, 2006

(51) Int. Cl.
    *G06F 19/00*     (2006.01)
(52) U.S. Cl. .......................................... 702/79; 702/89
(58) Field of Classification Search ............. 348/388.1, 348/425.1, 425.4; 702/71, 74, 79, 89; 714/12, 714/814
    See application file for complete search history.

(56) References Cited

U.S. PATENT DOCUMENTS 4,931,885 A * 6/1990 Mester et al. .................. 360/48
5,281,926 A * 1/1994 Rabii .......................... 331/14

OTHER PUBLICATIONS

Bunch, J; Le Borne, R; Proudler, I; ("A Conceptual Framework for Consistency, Conditioning and Stability Issues in Signal Processing"; IEEE Transactions on Signal Processing; vol. 49, Issue 9; Sep. 2001; pp. 1971-1981).*

* cited by examiner

*Primary Examiner*—Michael Nghiem
*Assistant Examiner*—Douglas N. Washburn
(74) *Attorney, Agent, or Firm*—McAndrews, Held & Malloy, Ltd (57) ABSTRACT

A system and method for determining signal consistency (e.g., in a video signal processing system) are disclosed. Various aspects of the present invention may, for example, include receiving a first and second signal, each of which includes respective first and second sub-signals. A receiving module may, for example, effect such receiving. The first and second signals may be synchronized according to, at least in part, aspects of their respective first sub-signals. A signal synchronization module may, for example, effect such synchronization. Relative timing between the respective second sub-signals of the first and second synchronized signals may be determined. A timing differential module may, for example, effect such a determination. Various aspects of the present invention may generate a signal indicative of signal consistency based, at least in part, on the determination of relative timing between the respective second sub-signals. An output module may, for example, effect such a signal generation.

29 Claims, 6 Drawing Sheets

SYSTEM AND METHOD FOR DETERMINING SIGNAL CONSISTENCY

BACKGROUND OF THE INVENTION

Signal processing systems generally receive one or more input signals to utilize in signal processing. Signal processing systems may, for example, process the input signals(s) directly or may utilize information contained in such input signals(s) to process other signals.

Signal characteristics of signals input to signal processing systems may very. Such variations may comprise, for example, signal strength variations, signal noise variations, data rate variations, information encoding variations, and timing variations, to name a few. Input signal characteristics may vary between different input signals and may vary within a single input signal. For example and without limitation, in a scenario where an input signal comprises multiple sub-signals, the sub-signals may have a timing relationship relative to each other. The timing relationship may be relatively stable and predictable or may be relatively unstable and unpredictable.

Signal processing systems may process or otherwise utilize input signals with varying signal characteristics. In such scenarios, the signal processing operations performed may depend on the varying signal characteristics.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method for determining signal consistency (e.g., in a video signal processing system). Various aspects of the present invention may, for example, comprise receiving a first signal and a second signal. A receiving module may, for example, effect such receiving. The first and second signals may each comprise, for example, respective first and second sub-signals. The first sub-signal may comprise, for example, periodic or non-periodic synchronization information. The second sub-signal may comprise, for example, data information, audio information, video information, or synchronization information. The first and second sub-signals may, for example, be integrated, time multiplexed, frequency multiplexed or code multiplexed.

The first and second signals may be synchronized (e.g., temporally synchronized) according to, at least in part, aspects of their respective first sub-signals. A signal synchronization module may, for example, effect such synchronization. For example, the first and second signals may be synchronized by phase-locking their respective first sub-signals. Alternatively, for example, the first and second signals may be synchronized by detecting a synchronization signal in at least one of the first sub-signals, determining a temporal shift based, at least in part, on the detected synchronization signal, and temporally shifting at least one of the first and second signals according to the determined temporal shift.

Differential timing between the respective second sub-signals of the synchronized first and second signals may be determined. A timing differential module may, for example, effect such a differential determination. Determining differential timing may comprise, for example, detecting when the second sub-signal of the first signal begins, and determining differential timing between the respective second sub-signals of the first and second signals based at least in part on when the second sub-signal of the first signal begins.

Alternatively, for example, determining differential timing may comprise detecting when a predetermined characteristic of the second sub-signal of the first signal occurs, and determining differential timing between the respective second sub-signals of the first and second signals based at least in part on when the predetermined characteristic occurs. Alternatively, for example, determining differential timing may comprise obtaining data from the second sub-signal of the first signal, and determining differential timing between the respective second sub-signals of the first and second signals based at least in part on the obtained data.

Various aspects of the present invention may generate a signal indicative of signal consistency based, at least in part, on the determination of relative timing between the respective second sub-signals. An output module may, for example, effect such a signal generation. Generating a signal indicative of signal consistency may comprise, for example, generating a signal indicative of relative timing between respective second sub-signals of the synchronized first and second signals. Alternatively, for example, generating such a signal may comprise comparing a determined differential timing to a threshold, and generating a signal indicative of the threshold comparison. Alternatively, for example, generating such a signal may comprise compiling differential timing information for a plurality of signals, performing statistical analysis of such differential timing information, and generating a signal based at least in part on the statistical analysis.

These and other advantages, aspects and novel features of the present invention, as well as details of illustrative aspects thereof, will be more fully understood from the following description and drawings.

DETAILED DESCRIPTION OF THE INVENTION

Figure 1:
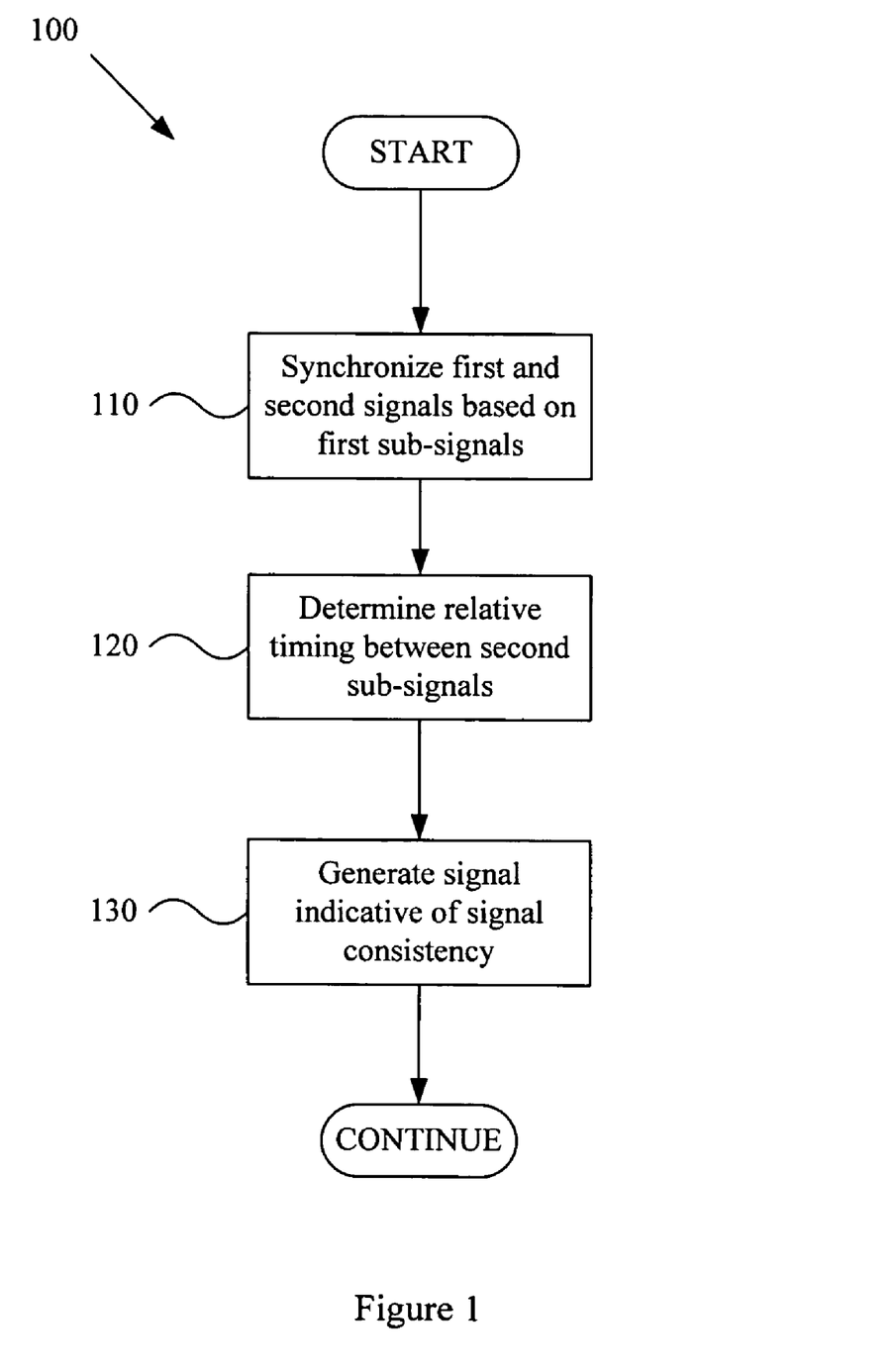
FIG. 1 is a flow diagram illustrating a method for determining signal consistency, in accordance with various aspects of the present invention.

FIG. 1 is a flow diagram illustrating a method 100 for determining signal consistency, in accordance with various aspects of the present invention. The method 100 may comprise, at step 110, synchronizing first and second signals based at least in part on respective first sub-signals of the first and second signals. Such synchronization may, for example and without limitation be viewed as a temporal synchronization, phase synchronization, data synchronization, etc. Many of the following examples will discuss temporal synchronization as an illustration of broader general synchronization. However, the scope of various aspects of the present invention should by no means be limited to temporal synchronization.

The first and second signals may comprise a large variety of signal and information types. The first and second signals may be analog or digital signals. For example, the first and second signals may be synchronously sampled or asynchronously sampled versions of originally analog signals. For example and without limitation, the first and second signals may carry video information, audio information, program information, synchronization information, textual information, etc. Accordingly, the scope of various aspects of the present invention should not be limited by characteristics of particular signal or information types.

The first and second signals may each comprise a respective first sub-signal. Such a first sub-signal may comprise, for example, synchronization information. For example and without limitation, a first sub-signal may comprise a periodic synchronization signal. In an exemplary scenario where the first and second signals are video signals, such a periodic synchronization signal may comprise chroma sub-carrier information. Alternatively, for example, a first sub-signal may comprise a synchronization pulse. Also, for example, a first sub-signal may comprise synchronization data. Further, for example, a first sub-signal may comprise information that is not used for synchronization purposes.

In general, a first sub-signal may comprise any of a variety of information and have any of a variety of signal characteristics. Accordingly, the scope of various aspects of the present invention should not be limited by characteristics of a particular type of first sub-signal.

Step 110 may comprise synchronizing (e.g., temporally synchronizing) the first and second signals using any of a variety of signal synchronization techniques. For example, step 110 may comprise phase locking the respective first sub-signals of the first and second signals. Step 110 may, for example, perform such phase locking utilizing a phase lock loop. In an exemplary video signal scenario, where the respective first sub-signals of the first and second signals comprise chroma sub-carrier information, step 110 may comprise phase locking the respective chroma sub-carrier signals.

Alternatively, for example, step 110 may comprise detecting synchronization pulse information included in the respective first sub-signals; determining a timing differential based, at least in part, on the detected information; and temporally aligning the first and second signals according to the determined timing differential. Alternatively, for example, step 110 may comprise reading data (e.g., synchronization timing data) in at least one of the respective first sub-signals and utilizing such information to determine a timing differential, which is then used to temporally synchronize the first and second signals.

Step 110 may perform temporal synchronization using any of a variety of temporal alignment techniques. For example, step 110 may align the first and second signals by time-shifting one or both of the first and second signals. In an exemplary digital scenario, step 110 may, for example, temporally align the first and second signals by whole samples or fractional samples (e.g., utilizing a fractional sample delay module). In an exemplary scenario where the first signal is a signal that was previously stored in memory, step 110 may comprise temporally shifting the first signal forward or backward in time relative to the second signal.

In general, step 110 comprises synchronizing (e.g., temporally synchronizing) the first and second signals based at least in part on respective first sub-signals of the first and second signals. Accordingly, the scope of various aspects of the present invention should not be limited by characteristics of a particular signal or a particular method for synchronizing the signals.

The method 100, at step 120, may comprise determining synchronization (e.g., relative timing) between respective second sub-signals of the first and second signals. Such a second sub-signal may, for example, comprise synchronization information. Such synchronization information may comprise any of a variety of synchronization signals, such as, for example, a synchronization pulse, a periodic synchronization signal, or synchronization data. A second sub-signal may comprise, for example, video information, audio information, programming information, graphical information, textual information, etc. In an exemplary scenario where the first and second signals are video signals, the second sub-signal may comprise active video information and/or synchronization pulses.

In general, a second sub-signal may comprise a variety of information and have a variety of characteristics. Accordingly, the scope of various aspects of the present invention should not be limited by characteristics of a particular second sub-signal.

In at least one of the first and second signals, the first and second sub-signals may, for example, be time multiplexed. Alternatively, for example, the first and second sub-signals may be frequency multiplexed or code multiplexed. The first and second sub-signals may be combined in their respective first and second signals in a variety of ways. Accordingly, the scope of various aspects of the present invention should not be limited by characteristics of a particular sub-signal combining or multiplexing scheme.

Step 120 may comprise, for example, detecting when at least one of the respective second sub-signals of the first and second signals begins. Step 120 may then, for example, determine relative timing between the respective second sub-signals based at least in part on when the second sub-signal begins. In an exemplary scenario involving a video signal, step 120 may comprise detecting when an active video portion of the video signal begins or when a sync pulse or temporal offset from a sync pulse of the video signal begins.

Alternatively, for example, step 120 may comprise detecting any of a variety of predetermined characteristics of the second sub-signal to determine timing of the second sub-signal. For example and without limitation, step 120 may comprise detecting a data value, a range of data values, a pattern of signal behavior, or any of a variety of predetermined characteristics that may be utilized to identify sub-signal timing. Step 120 may then, for example, determine relative timing between the respective second sub-signals based, at least in part, on when the predetermined characteristic of the second sub-signal occurs.

Alternatively, for example, step 120 may comprise obtaining data (e.g., timing data) from the second sub-signal of at least one of the first and second signals. Step 120 may then, for example, utilize the obtained data to determine relative timing between the respective second sub-signals based at least in part on the obtained data.

In another example, step 120 may comprise utilizing a known temporal relationship between the second sub-signals of the first or second signal and another detected sub-signal of the first or second signal. For example and without limitation, step 120 may comprise determining the timing of the second sub-signal based, at least in part, on determining the timing of a third sub-signal and utilizing a known temporal relationship between the third sub-signal and the second sub-signal to determine the timing of the second sub-signal. In an exemplary video scenario, step 120 may comprise detecting a horizontal sync pulse in the second signal, and based at least in part on the timing of the detected horizontal sync pulse and a known temporal relationship between the horizontal sync pulse and active video information, determine the timing of the active video portion of the second signal.

In general, step 120 comprises determining relative timing between respective second sub-signals of the first and second signals. Accordingly, the scope of various aspects of the present invention should not be limited by characteristics of a particular second sub-signal or by characteristics of a particular method for determining relative timing between signals.

The method, at step 130, comprises generating a signal indicative of signal consistency based, at least in part, on the relative timing between the respective second sub-signals of the first and second signals determined at step 120.

Step 130 may comprise, for example, generating a signal indicative of the relative timing between respective second sub-signals that was determined at step 120. Alternatively, step 130 may comprise, for example, comparing the relative timing determined at step 120 to a threshold, and generating a signal indicative of the threshold comparison. In an exemplary video scenario, step 130 may comprise comparing the relative timing determined at step 120 to a threshold indicative of compliance with the NTSC standard, and generating a signal indicative of compliance with the NTSC standard.

Step 130 may comprise, for example, performing statistical processing on information, including the relative timing determined at step 120. Such information may, for example, comprise relative timing information for a plurality of current and previous signal pairs. By way of example, step 130 may comprise calculating a running average of a plurality of relative timings determined at step 120. Such statistical processing may comprise, for example, performing statistical trend analysis of a plurality of relative timings determined at step 120. Such statistical processing may comprise, for example, performing a variance analysis of a plurality of the relative timings determined at step 120. Step 130 may then, for example, comprise generating a signal indicative of the results of such statistical analysis.

In an exemplary scenario, the method 100 may comprise synchronizing a third signal and a fourth signal based at least in part on a first sub-signal of the third signal and a first sub-signal of the fourth signal. The third signal may, for example, correspond to a portion of the same overall signal stream that the first signal corresponds to. The fourth signal may, for example, correspond to a portion of the same overall signal stream that the second signal corresponds to. Alternatively, for example, the third and fourth signals may be completely independent of the first and second signals.

Continuing the exemplary scenario, the method 100 may comprise determining a second relative timing between respective second sub-signals of the synchronized third and fourth signals. The method 100 may comprise statistically analyzing information comprising the second relative timing and the first relative timing determined previously between respective second sub-signals of the synchronized first and second signals, and generating a signal indicative of signal consistency based at least in part on the statistical analysis.

Step 130 generally comprises generating a signal indicative of signal consistency based, at least in part, on the step 120 determination of relative timing between the respective second sub-signals of the first and second signals. Such signal generating may or may not comprise performing signal processing on current and/or past relative timing determinations from step 120. Accordingly, the scope of various aspects of the present invention should not be limited by the existence of such signal processing or by characteristics of a particular signal processing technique. Nor should the scope of various aspects of the present invention be limited by the characteristics of a particular generated signal.

Figure 2:
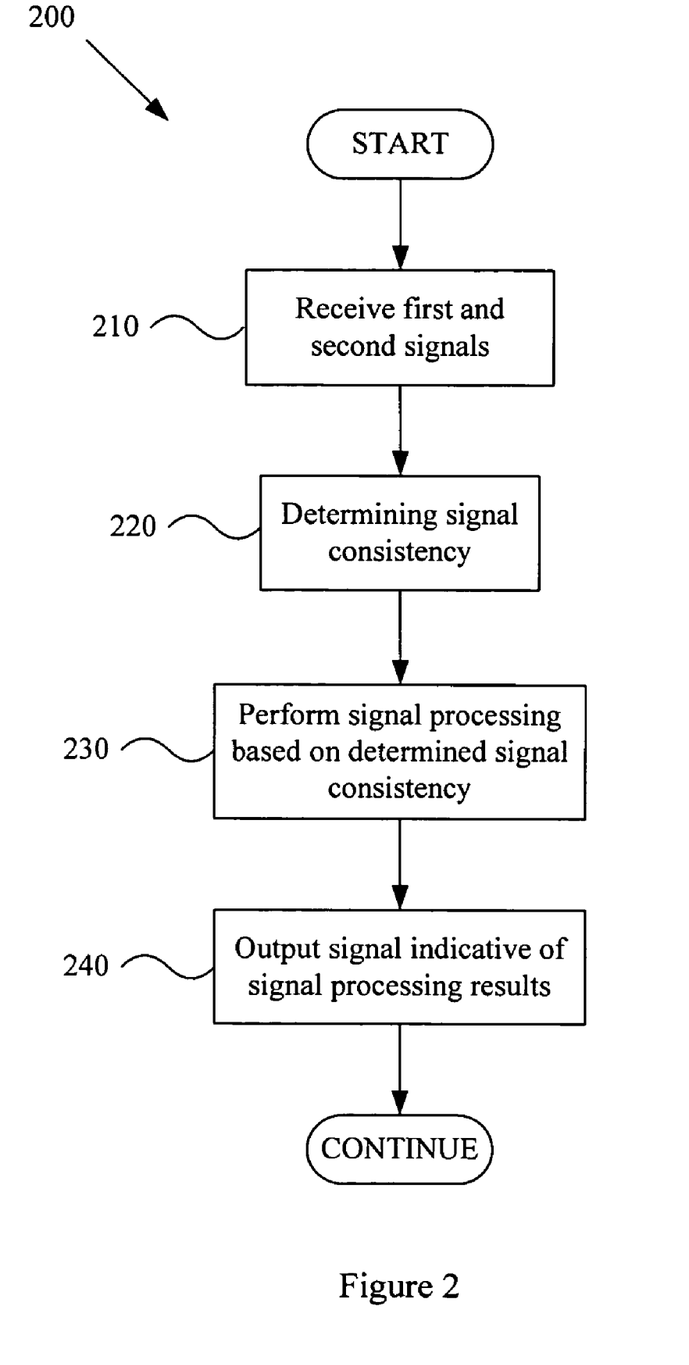
FIG. 2 is a flow diagram illustrating a signal processing method, in accordance with various aspects of the present invention.

FIG. 2 is a flow diagram illustrating a signal processing method 200, in accordance with various aspects of the present invention. The method 200, at step 210, may comprise receiving a first signal and a second signal. The first and second signals may, for example, be similar to the first and second signals described previously, with regard to the method 100 illustrated in FIG. 1. The first and second signals may, for example, be received consecutively or simultaneously. Also, the first and second signals may be received from internal or external sources. For example and without limitation, the first signal may be received from a memory device, and the second signal may be received from upstream signal processing circuitry. Accordingly, the scope of various aspects of the present invention should not be limited by characteristics of a particular method of receiving a signal or by characteristics of a particular source of a signal.

The method 200, at step 220, may comprise determining signal consistency between the received first and second signals. Such a consistency determination may, for example, comprise performing various aspects of the method 100 illustrated at FIG. 1 and discussed previously.

For example and without limitation, step 220 may comprise synchronizing (e.g., temporally synchronizing) the first signal and the second signal based, at least in part, on the first sub-signal of the first signal and the first sub-signal of the second signal; determining relative timing between the respective second sub-signals of the synchronized first and second signals; and generating a signal indicative of signal consistency based, at least in part, on the determination of relative timing between the respective second sub-signals.

The method 200, at step 230, may comprise performing signal processing on at least one of the first and second signals. Such signal processing may, for example, be a function of the signal consistency determined at step 220. For example, step 230 may comprise performing a first signal processing operation on at least one of the first and second signals when step 220 determines that the first and second signals meet a predetermined measure of signal consistency, and performing a second signal processing operation on at least one of the first and second signals when step 220 determines that the first and second signals do not meet the predetermined measure of signal consistency.

In an exemplary scenario including video signals, step 230 may comprise performing three-dimensional comb filtering using the first and second signals when step 220 determines that the first and second signals are consistent enough for such processing to be beneficial, and performing two-dimensional comb filtering using, either of the first and second signals when step 220 determines that the first and second signals are not consistent enough for three-dimensional comb filtering to be beneficial.

In general, step 230 comprises performing signal processing on at least one of the first and second signals, where such signal processing is based, at least in part, on the signal consistency determined at step 220. Accordingly, the scope of various aspects of the present invention should not be limited by characteristics of a particular signal, signal processing technique or method for determining signal consistency.

The method, at step 240, comprises outputting a signal indicative of the results of the step 230 signal processing (e.g., a signal based on or comprising the results of the step 230 signal processing). For example, step 240 may comprise outputting a digital data signal indicative of the results of the signal processing performed at step 230. Alternatively, for example, step 240 may comprise outputting a signal indicative of the results of the step 230 signal processing to a subsequent system that is capable of converting the output signal to a human-perceivable signal. In an exemplary video signal-processing scenario, step 240 may comprise outputting a signal indicative of the results of the step 230 signal processing to a television or computer system. In exemplary audio signal processing scenario, step 240 may comprise outputting a signal indicative of the results of the step 230 signal processing to a stereo, surround sound or multi-media system.

Alternatively, for example, step 240 may comprise outputting a signal indicative of the results of the step 230 to a user in human-perceivable form. In an exemplary video signal-processing scenario, step 240 may comprise outputting a signal to a user on a video display. In an exemplary audio signal-processing scenario, step 240 may comprise outputting a signal to a user through an audio output system.

Step 240 generally comprises outputting a signal indicative of the results of the step 230 signal processing. Accordingly, the scope of various aspects of the present invention should not be limited by characteristics of a particular signal or signal processing technique. Nor should the scope of various aspects of the present invention be limited by characteristics of a particular form of output signal.

Figure 3:
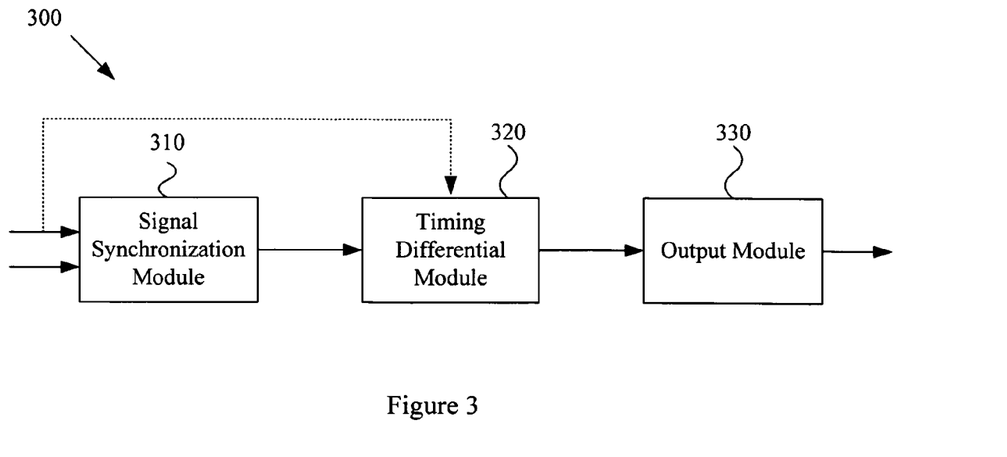
FIG. 3 is a diagram showing a system for generating a signal indicative of signal consistency, in accordance with various aspects of the present invention.

FIG. 3 is a diagram showing a system 300 for generating a signal indicative of signal consistency, in accordance with various aspects of the present invention. The system 300 may, for example, generate a signal indicative of consistency between a first signal and a second signal or a plurality of first and second signals.

The first and second signals may comprise any of a variety of signal and information types. The first and second signals may be analog or digital signals. For example, the first and second signals may be synchronously or asynchronously sampled versions of originally analog signals. For example and without limitation, the first and second signals may carry video information, audio information, program information, synchronization information, textual information, etc. Accordingly, the scope of various aspects of the present invention should not be limited by characteristics of a particular signal or information type.

The first and second signals may each comprise a respective first sub-signal and a respective second sub-signal. The first and second sub-signals in each of the first and second signals may, for example, be time multiplexed. Alternatively, for example, the first and second sub-signals may be frequency multiplexed or code multiplexed. The first and second sub-signals may be combined in their respective first and second signals in a variety of ways. Accordingly, the scope of various aspects of the present invention should not be limited by characteristics of a particular sub-signal combining or multiplexing technique.

The first sub-signal may comprise, for example, synchronization information. For example and without limitation, a first sub-signal may comprise a periodic synchronization signal. In an exemplary scenario where the first and second signals are video signals, such a periodic synchronization signal may comprise chroma sub-carrier information. Alternatively, for example, a first sub-signal may comprise a synchronization pulse. Also, for example, a first sub-signal may comprise synchronization data. Further, for example, a first sub-signal may also comprise information that is not used for synchronization purposes.

In general, a first sub-signal may comprise any of a variety of information and have any of a variety of signal characteristics. Accordingly, the scope of various aspects of the present invention should not be limited by characteristics of a particular type of first sub-signal.

The second sub-signal may, for example, comprise synchronization information. Such synchronization information may comprise any of a variety of synchronization signals, such as a synchronization pulse, a periodic synchronization signal, or synchronization data. A second sub-signal may, for example, comprise video information, audio information, programming information, synchronization information, graphical information, textual information, etc. In an exemplary scenario where the first and second signals are video signals, the second sub-signal may comprise active video information.

In general, a second sub-signal may comprise any of a variety of information and have any of a variety of signal characteristics. Accordingly, the scope of various aspects of the present invention should not be limited by characteristics of a particular second sub-signal.

The system 300 comprises a signal synchronization module 310 that synchronizes (e.g., temporally synchronizes) received first and second signals by adjusting the timing of at least one of the first and second signals. The signal synchronization module 310 may, for example, determine a timing adjustment based, at least in part, on the respective first sub-signals of the first signal and the second signal. The signal synchronization module 310 may then, for example, temporally align the first and second signals based on the determined timing adjustment.

Aspects of an exemplary signal synchronization module may, for example and without limitation, be found in U.S. patent application Ser. No. 10/794,601, filed Mar. 5, 2004, entitled "Closed Loop Sub-carrier Synchronization System," which is hereby incorporated herein in its entirety by reference. It is stressed that the scope of various aspects of the present invention should by no means be limited by aspects of such an exemplary system.

Figure 4:
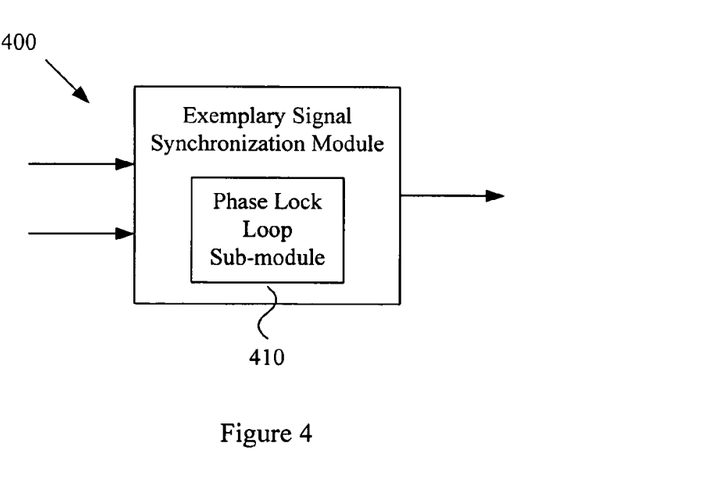
FIG. 4 is a diagram showing an exemplary signal synchronization module, in accordance with various aspects of the present invention.

The signal synchronization module 310 may utilize a variety of modules to synchronize the received first and second signals. For example and without limitation, FIG. 4 is a diagram showing an exemplary signal synchronization module 400, in accordance with various aspects of the present invention. The exemplary signal synchronization module 400 may be utilized as the signal synchronization module 310 of FIG. 3. The exemplary signal synchronization module 400 may comprise a phase lock loop sub-module 410 that temporally aligns the first and second signals by phase locking their respective first sub-signals.

For example and without limitation, in an exemplary scenario including video signals, the phase lock loop sub-module 410 may receive the first and second signals. The exemplary first and second video signals may comprise respective first sub-signals, each of which comprises chroma sub-carrier information. The exemplary phase lock loop sub-module 410 may then align (e.g., temporally align) the first and second signals by locking the phases of the chroma sub-carrier information of the first signal and the chroma sub-carrier information of the second signal. The exemplary phase lock loop sub-module 410 may then output one or both of the synchronized first and second signals.

The exemplary phase lock loop sub-module 410 may temporally align (or phase align) the first and second signals utilizing any of a variety of alignment circuits or techniques. For example and without limitation, the phase lock loop sub-module 410 may utilize a fractional sample delay circuit to adjust at least one of the signals. The phase lock loop sub-module 410 may, for example, perform alignment by adjusting sample clock frequency.

It should be noted that the exemplary signal synchronization module 400 illustrated in FIG. 4 is but one example of the signal synchronization module 310 illustrated in FIG. 3. Accordingly, the scope of various aspects of the present invention should not be limited by characteristics of the exemplary signal synchronization module 400 illustrated in FIG. 4, or by characteristics of a phase lock loop module.

Figure 5:
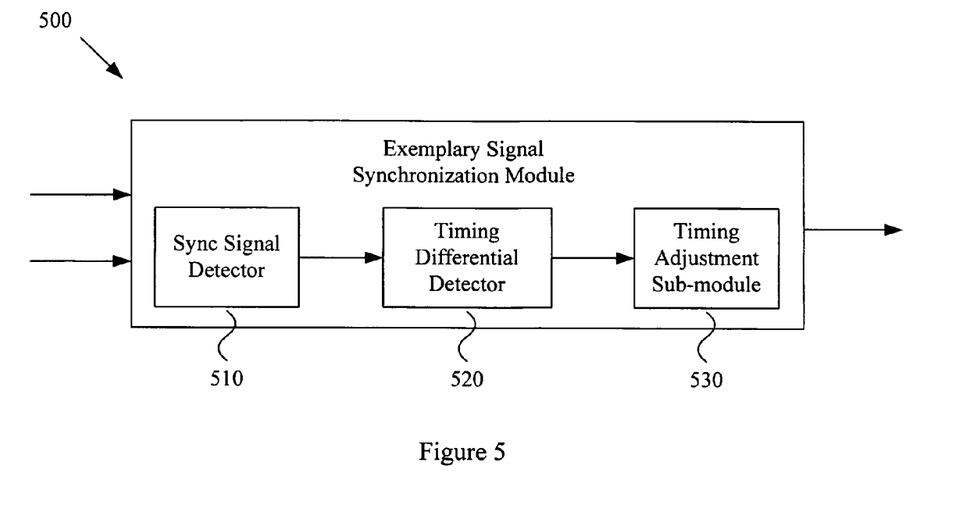
FIG. 5 is a diagram showing an exemplary signal synchronization module, in accordance with various aspects of the present invention.

For another example of a signal synchronization module 310, FIG. 5 is a diagram showing an exemplary signal synchronization module 500, in accordance with various aspects of the present invention.

The exemplary signal synchronization module 500 illustrated in FIG. 5 may, for example, be utilized as the synchronization module 310 of FIG. 3. The exemplary signal synchronization module 500 may comprise a sync signal detector 510 that detects a synchronization signal in the first sub-signal of at least one of the first and second signals. The sync signal detector 510 may, for example, detect a sync pulse in the first sub-signal. In an exemplary scenario involving video signals, the sync signal detector 510 may detect a horizontal sync pulse, a vertical sync pulse, or any other sync pulse that may reside in a video signal.

The exemplary signal synchronization module 500 may also comprise a timing differential detector 520 (or module), communicatively coupled to the sync signal detector 510, that determines a temporal shift based, at least in part, on the sync signal detected by the sync signal detector 510. For example, the timing differential detector 520 may compare timing of corresponding sync signals detected in the respective first sub-signals of the first and second signals. Alternatively, for example, the timing differential detector 520 may compare timing of a sync signal detected in the first sub-signal of the first signal with timing of an alternative signal detected in the first sub-signal of the second signal.

The exemplary signal synchronization module 500 may also comprise a timing adjustment sub-module 530, communicatively coupled to the timing differential detector 520, that adjusts timing of at least one of the first and second signals according the temporal shift determined by the timing differential detector 520. The timing adjustment module 530 may comprise any of a variety of circuits or modules that adjust signal timing. For example and without limitation, the timing adjustment sub-module 530 may comprise a whole sample delay circuit and/or a fractional sample delay circuit. In a scenario where at least a portion of the first or second signal is stored in a memory, the timing adjustment sub-module 530 may comprise a module that pushes a signal ahead in time rather than delaying the signal. After adjusting the signal timing of at least one of the first and second signals, the timing adjustment module 530 may output one or both of the temporally synchronized first and second signals.

Figure 6:
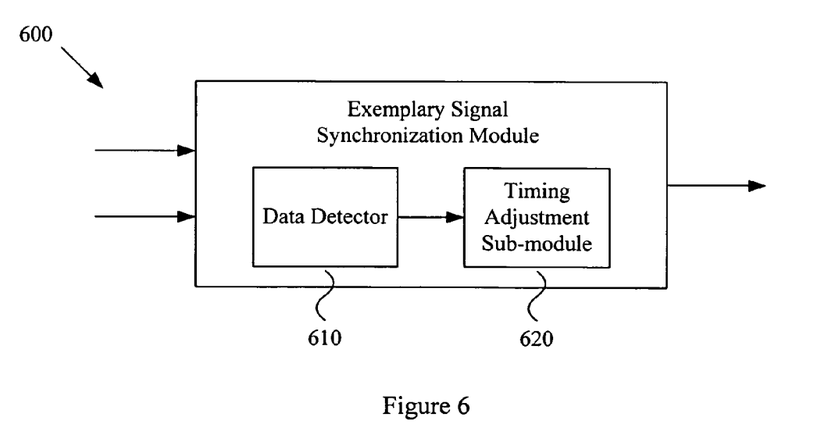
FIG. 6 is a diagram showing an exemplary signal synchronization module, in accordance with various aspects of the present invention.

For another example of a signal synchronization module 310, FIG. 6 is a diagram showing an exemplary signal synchronization module 600, in accordance with various aspects of the present invention. The exemplary signal synchronization module 600 illustrated in FIG. 6 may, for example, be utilized as the synchronization module 310 of FIG. 3. The exemplary signal synchronization module 600 may comprise a data detector 610 that detects synchronization data in the first sub-signal of at least one of the first and second signals. The data detector 610 may, for example, detect information in at least one of the first and second signals that is indicative of signal timing. Such information may, for example, comprise signal timestamp information. The data detector 610 may then, for example, determine a temporal shift to synchronize the first and second signals.

The exemplary signal synchronization module 600 may also comprise a timing adjustment sub-module 620, communicatively coupled to the data detector 610, that adjusts timing of at least one of the first and second signals according to the temporal shift determined by the data detector 610.

Referring back to FIG. 3, the signal synchronization module 310 generally synchronizes (e.g., temporally synchronizes) the first and second signals by adjusting the timing of at least one of the first and second signals. The exemplary signal synchronization modules 400, 500 and 600, shown in FIGS. 4–6 represent examples of modules that could be utilized for the signal synchronization module 310. The scope of various aspects of the present invention should by no means be limited to characteristics of the exemplary signal synchronization modules 400, 500 and 600.

The system 300 may comprise a timing differential module 320, communicatively coupled to the signal synchronization module 310, that receives information of the synchronized first and second signals, and determines relative timing between respective second sub-signals of the synchronized first and second signals. The timing differential module 320 may, for example, receive information of the synchronized first and second signals from the signal synchronization module 310 and/or other system components.

Figure 7:
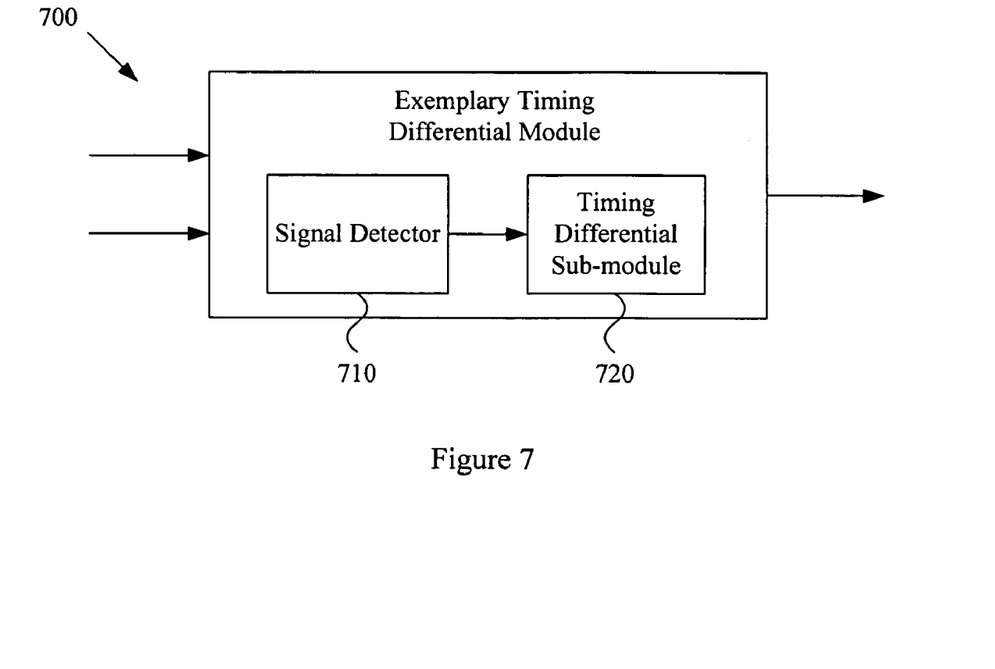
FIG. 7 is a diagram showing an exemplary timing differential module in accordance with various aspects of the present invention.

FIG. 7 is a diagram showing an exemplary timing differential module in accordance with various aspects of the present invention. The timing differential module 700 may, for example, be utilized as the timing differential module 320 of FIG. 3. The timing differential module 700 may, for example, comprise a signal detector 710 that receives at least one of the first and second signals as input. The signal detector sub-module 710 may, for example, detect timing of when a predetermined signal characteristic occurs in a second sub-signal of the first or second signals. For example and without limitation, the signal detector 710 may analyze a second sub-signal to determine when the second sub-signal begins. In an exemplary scenario involving video signals, the signal detector 710 may detect when a second sub-signal begins carrying active video information.

Alternatively, for example, the signal detector 710 may detect the time at which a predetermined flag or data value occurs in a second sub-signal. Also, for example, the signal detector 710 may detect the occurrence of a range of data values, a pattern of signal behavior or any of a variety of predetermined signal characteristics that may be utilized to identify timing. Alternatively, for example, the signal detector 710 may obtain data from the second sub-signal that is indicative of signal timing (e.g., signal timestamp information).

The exemplary timing differential module 700 may comprise a timing differential sub-module 720, communicatively coupled to the signal detector 710, that determines relative timing between the respective second sub-signals of the first and second signals. Such determination may be based, at least in part, on timing information received from the signal detector 710. For example, such determination may be based, at least in part, on the time at which the signal detector 710 detects a predetermined signal characteristic in one or more respective second sub-signals. Alternatively, for example such determination may be based, at least in part, on timing data obtained from the second sub-signal by the signal detector 710.

Referring back to FIG. 3, the timing differential module 320 generally receives information of the synchronized first and second signals, and determines relative timing between the respective second sub-signals of the synchronized first and second signals. The exemplary timing differential module 700 shown in FIG. 7 represents one example of a module that could be utilized for the timing differential module 320. The scope of various aspects of the present invention should by no means be limited to characteristics of the exemplary timing differential module 700.

The timing differential module 320 may, for example, receive information of a third sub-signal from at least one of the first and second signals. The timing differential module 320 may utilize such information to determine relative timing between the respective second sub-signals of the first and second signals. For example and without limitation, the timing differential module 320 may determine the timing of a second sub-signal based at least in part on determining the timing of a third sub-signal and utilizing a known temporal relationship between the third sub-signal and the second sub-signal to determine the timing of the second sub-signal. As an example, consider an exemplary scenario involving video information. In the exemplary scenario the timing differential module 320 may, for example, receive information of horizontal sync pulse timing for one of the first and second signals and determine the beginning of the corresponding active video portion of the video signal based on a known temporal relationship between the horizontal sync pulse and the beginning of the active video portion of the video signal.

The system 300 may comprise an output module 330, communicatively coupled to the timing differential module 320, that outputs a signal indicative of signal consistency based, at least in part, on relative timing information received from the timing differential module 320. For example, the output module 330 may output a signal indicative of relative timing between the respective second sub-signals of the synchronized first and second signals.

Figure 8:
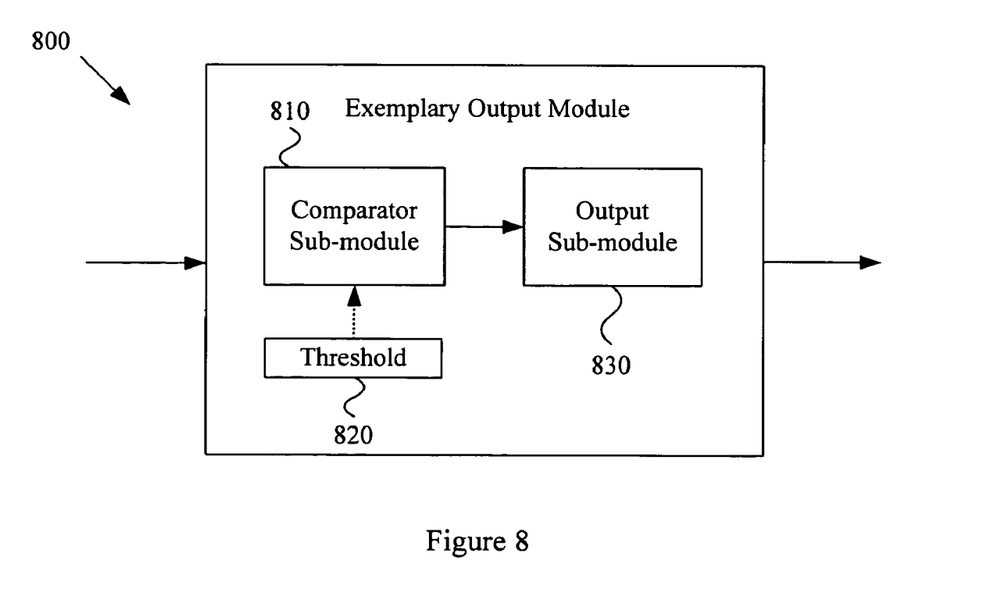
FIG. 8 is a diagram showing an exemplary output module, in accordance with various aspects of the present invention.

FIG. 8 is a diagram showing an exemplary output module 800, in accordance with various aspects of the present invention. The exemplary output module 800 may, for example, be utilized to implement the output module 330 illustrated in FIG. 3. The exemplary output module 800 may comprise a comparator sub-module 810 that receives information of relative timing between respective second sub-signals of a first and second signal. The comparator sub-module 810 may also, for example, receive information of a threshold 820. The comparator sub-module 810 may compare the information of relative timing between second sub-signals to the threshold 820.

The exemplary output module 800 may comprise an output sub-module 830, communicatively coupled to the comparator sub-module 810, that outputs a signal indicative of signal consistency based at least in part on the threshold comparison. In an exemplary scenario involving video signals, the threshold 820 may be related to a consistency between signals that is required of signals compliant with NTSC standards. In such a scenario, the output signal indicative of signal consistency may comprise a signal indicative of whether the signal consistency complies with NTSC standards. In an exemplary scenario, the output signal indicative of signal consistency may comprise a signal indicative of whether performing three-dimensional comb filtering utilizing the signals would be beneficial.

Figure 9:
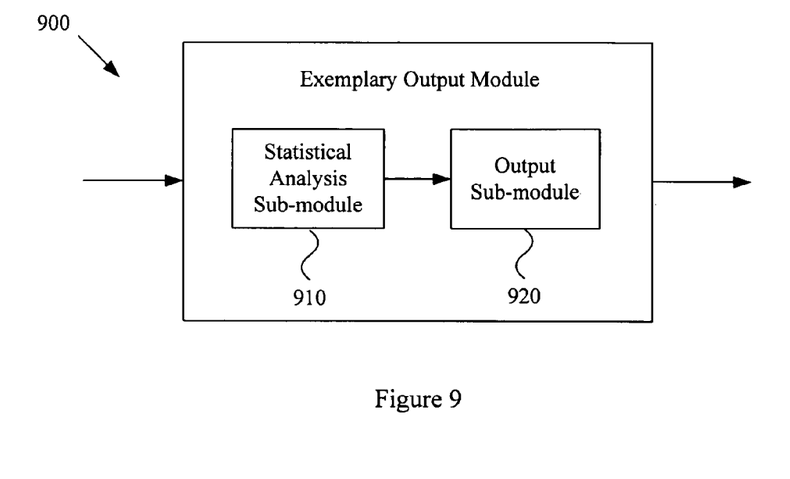
FIG. 9 is a diagram showing an exemplary output module, in accordance with various aspects of the present invention.

FIG. 9 is a diagram showing another exemplary output module 900, in accordance with various aspects of the present invention. The exemplary output module 900 may, for example, be utilized to implement the output module 330 illustrated in FIG. 3. The exemplary output module 900 may comprise a statistical analysis sub-module 910 that receives information of relative timing between respective second sub-signals of a first and second signal.

The statistical analysis sub-module 910 may perform a variety of statistical analysis methods on the relative timing information of current and previous signals. For example and without limitation, the statistical analysis sub-module 910 may calculate a running average of a plurality of relative timings determined by the timing differential module 320. Alternatively, for example, the statistical analysis sub-module 910 may perform statistical trend analysis of a plurality of relative timings determined by the timing differential module 320.

The exemplary output module 900 may comprise an output sub-module 920, communicatively coupled to the statistical analysis sub-module 910, that outputs a signal indicative of signal consistency based at least on part on the statistical analysis performed by the statistical analysis sub-module 910. Such a signal may, for example, be indicative of various statistical analyses, comprising trend analysis, averaging, and variance analysis.

Referring back to FIG. 3, the output module 330 generally outputs a signal indicative of signal consistency based, at least in part, on the relative timing determined by the timing differential module 320. The exemplary output modules 800, 900 illustrated in FIG. 8–9 are merely exemplary. Accordingly, the scope of various aspects of the present invention should not be limited by characteristics of the exemplary output modules 800, 900.

Figure 10:
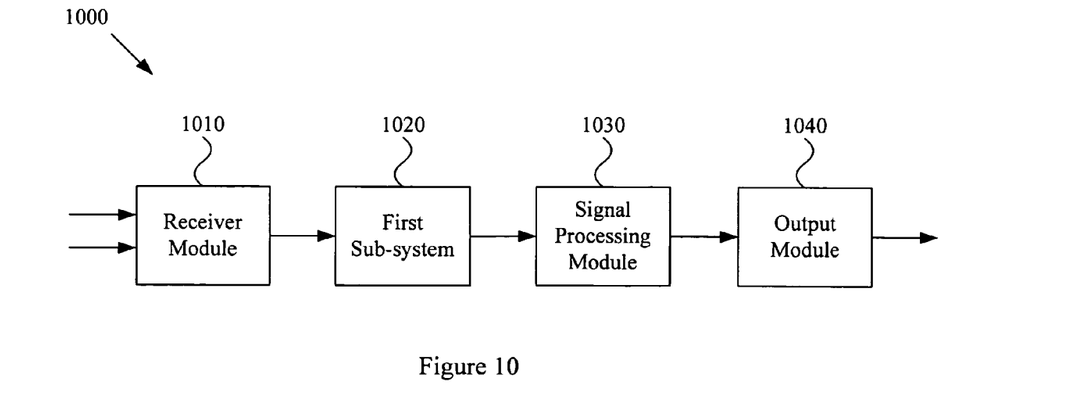
FIG. 10 is a diagram showing a signal processing system, in accordance with various aspects of the present invention.

FIG. 10 is a diagram showing a signal processing system 1000, in accordance with various aspects of the present invention. The signal processing system 1000 may comprise a receiver module 1010 that receives a first signal and a second signal, each of the first signal and the second signal comprising a first sub-signal and a second sub-signal. The first and second signals and their respective sub-signals may, for example, be similar to the first and second signals described previously, with regard to the methods 100, 200 illustrated in FIGS. 1–2 and the system 300 shown in FIG. 3.

The receiver module 1010 may, for example, receive the first and second signals consecutively or simultaneously. Also, the receiver module 1010 may, for example, receive the first and second signals from internal or external sources. For example and without limitation, the receiver module 1010 may receive the first signal from a local memory device, and the second signal from upstream signal processing circuitry. Accordingly, the scope of various aspects of the present invention should not be limited by characteristics of a particular apparatus for receiving a signal or by characteristics of a particular signal source.

The signal processing system 1000 may comprise a first sub-system 1020, communicatively coupled to the receiver module 1010, that receives information of the first and second signals from the receiver module 1010 and generates a signal indicative of signal consistency. The first sub-system 1020 may, for example, comprise various aspects of the system 100 illustrated in FIG. 1 and discussed previously.

The first sub-system 1020 may, for example, synchronize (e.g., temporally synchronize) the first signal and the second signal according to their respective first sub-signals. The first sub-system 1020 may, for example, determine relative timing between respective second sub-signals of the synchronized first and second signals. The first sub-system 1020 may, for example, generate a signal indicative of signal consistency based, at least in part, on the determination of relative timing between the respective second sub-signals.

The signal processing system 1000 may comprise a signal processing module 1030, communicatively coupled to the first sub-system 1020, that receives a signal indicative of signal consistency from the first sub-system 1020 and also receives information of at least one of the first and second signals. The signal processing module 1030 may, for example, perform signal processing on at least one of the first and second signals, where the signal processing is based, at least in part, on the signal indicative of signal consistency received from the first sub-system 1020.

In an exemplary scenario involving video signals, the signal processing module 1030 may perform signal processing comprising three-dimensional comb filtering using the first and second signals when the signal processing module 1030 determines that the first and second signals are consistent enough for such processing to be beneficial, and performing two-dimensional comb filtering using either of the first and second signals when the signal processing module 1030 determines that the first and second signals are not consistent enough for three-dimensional comb filtering to be beneficial.

In general, the signal processing module 1030 performs signal processing on at least one of the first and second signals, where such signal processing is based, at least in part, on the signal indicative of signal consistency received from the first sub-system 1020. Accordingly, the scope of various aspects of the present invention should not be limited by characteristics of a particular signal type, signal processing technique or signal consistency determination.

The system 1000 may comprise an output module 1040, communicatively coupled to the signal-processing module 1030, that outputs a signal indicative of the results of the signal processing performed by the signal-processing module 1030. The output module 1040 may, for example, output a digital signal indicative of the results of the signal processing performed by the signal-processing module 1030. Alternatively, for example, the output module 1040 may output a signal indicative of the signal processing performed by the signal-processing module 1030 to a subsequent system capable of converting the output signal to a human-perceivable signal. In an exemplary video signal processing scenario, the output module 1040 may output a signal indicative of the signal processing performed by the signal processing module 1030 to a television or computer system with video output capability. In exemplary audio signal processing scenario, the output module 1040 may output a signal indicative of the signal processing performed by the signal processing module 1030 to a stereo, surround sound or computer system with audio output capability.

Alternatively, for example, the output module 1040 may output a signal indicative of the signal processing performed by the signal-processing module 1030 to a user in human-perceivable form. In an exemplary video signal-processing scenario, the output module 1040 may comprise a video display module that outputs a human-perceivable signal to a user. In an exemplary audio signal-processing scenario, the output module 1040 may comprise an audio output system that outputs a human-perceivable signal to a user.

The output module 1040 generally outputs a signal indicative of the results of the signal processing performed by the signal-processing module 1030. Accordingly, the scope of various aspects of the present invention should not be limited by characteristics of a particular output signal or by characteristics of a particular apparatus utilized to output such signals.

The previous discussion described various modules and sub-modules. The various modules and sub-modules may be implemented using hardware, software, or a combination thereof. For example and without limitation, any of the various modules and sub-modules may be stand-alone circuits or may be integrated into a single integrated circuit. Accordingly, the scope of various aspects of the present invention should not be limited to characteristics of a particular hardware or software implementation.

In summary, various aspects of the present invention provide a system and method for determining signal consistency and for generating a signal indicative of such signal consistency. Additionally, various aspects of the present invention provide a system and method for performing signal processing that comprises utilization of such signal consistency information.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will comprise all embodiments falling within the scope of the appended claims.

What is claimed is:

1. A method for determining signal consistency utilizing a first signal and a second signal, each of the first signal and the second signal comprising a first sub-signal and a second sub-signal, the method comprising:
   synchronizing the first signal and the second signal based at least in part on the first sub-signal of the first signal and the first sub-signal of the second signal;
   determining relative timing between the respective second sub-signals of the synchronized first and second signals; and
   generating a signal indicative of signal consistency based, at least in part, on the determination of relative timing between the respective second sub-signals.

2. The method of claim 1, wherein the first sub-signal of the first signal comprises a periodic synchronization signal.

3. The method of claim 1, wherein the second sub-signal of the first signal comprises video information.

4. The method of claim 1, wherein the first sub-signal of the first signal is time multiplexed with the second sub-signal of the first signal.

5. The method of claim 1, wherein synchronizing the first signal and the second signal comprises phase locking the respective first sub-signals of the first and second signals.

6. The method of claim 1, wherein the first sub-signal of the first signal comprises a synchronization signal, and synchronizing the first signal and the second signal comprises:
   detecting the synchronization signal;
   determining a time shift based at least in part on the synchronization signal; and
   time shifting at least one of the first and second signals according to the determined time shift.

7. The method of claim 1, wherein determining relative timing between the respective second sub-signals of the synchronized first and second signals comprises:
   detecting when a predetermined characteristic of the second sub-signal of the first signal occurs; and
   determining relative timing between the respective second sub-signals based at least in part on when the predetermined characteristic of the second sub-signal of the first signal occurs.

8. The method of claim 1, wherein determining relative timing between the respective second sub-signals of the synchronized first and second signals comprises determining relative timing between the respective second sub-signals based at least in part on a known temporal relationship between the second sub-signal of the first signal and a third sub-signal of the first signal.

9. The method of claim 1, wherein generating a signal indicative of signal consistency comprises generating a signal indicative of the relative timing between the respective second sub-signals of the synchronized first and second signals.

10. The method of claim 1, wherein generating a signal indicative of signal consistency comprises:
    comparing the determined relative timing to a threshold; and
    generating a signal indicative of the threshold comparison.

11. The method of claim 1, further comprising:
    synchronizing a third signal and a fourth signal based at least in part on a first sub-signal of the third signal and a first sub-signal of the fourth signal; and
    determining a second relative timing between respective second sub-signals of the synchronized third and fourth signals; and
    wherein generating a signal indicative of signal consistency comprises:
    statistically analyzing information comprising information of the determined relative timing and information of the second determined relative timing; and
    generating a signal based at least in part on the statistical analysis.

12. A signal processing method comprising:
    determining signal consistency utilizing a first signal and a second signal, wherein each of the first signal and the second signal comprise a first sub-signal and a second sub-signal, and determining signal consistency comprises:
        synchronizing the first signal and the second signal based at least in part on the first sub-signal of the first signal and the first sub-signal of the second signal;
        determining relative timing between the respective second sub-signals of the synchronized first and second signals; and
        generating a signal indicative of signal consistency based, at least in part, on the determination of relative timing between the respective second sub-signals;
    performing a signal processing operation on at least one of the first signal and the second signal, the signal processing operation being a function of the determined signal consistency; and
    outputting a signal indicative of the results of the signal processing operation.

13. The method of claim 12, wherein outputting a signal indicative of the results of the signal processing operation comprises outputting the signal indicative of the results of the signal processing operation to a system capable of converting the output signal to a human-perceivable signal.

14. The method of claim 12, wherein outputting a signal indicative of the results of the signal processing operation comprises outputting a human-perceivable signal indicative of the results of the signal processing operation.

15. A system for generating a signal indicative of consistency utilizing a first signal and a second signal, each of the first signal and the second signal comprising a first sub-signal and a second sub-signal, the system comprising:
    a signal synchronization module that synchronizes the first and second signals by adjusting at least one of the first and second signals, the signal synchronization module determining an adjustment based, at least in part, on the first sub-signal of the first signal and the first sub-signal of the second signal;
    a timing differential module, communicatively coupled to the synchronization module, that receives information of the synchronized first and second signals and determines relative timing between the respective second sub-signals of the synchronized first and second signals; and
    an output module, communicatively coupled to the timing differential module, that outputs a signal indicative of signal consistency based, at least in part, on the relative timing determined by the timing differential module.

16. The system of claim 15, wherein the first sub-signal of the first signal comprises a periodic synchronization signal.

17. The system of claim 15, wherein the second sub-signal of the first signal comprises video information.

18. The system of claim 15, wherein the first sub-signal of the first signal is time multiplexed with the second sub-signal of the first signal.

19. The system of claim 15, wherein the signal synchronization module comprises a phase lock loop sub-module that receives phase information of the respective first sub-signals of the first and second signals, and adjusts the timing of at least one of the first and second signals based on the received phase information.

20. The system of claim 15, wherein the signal synchronization module comprises:
    a sync signal detector that detects a synchronization signal in the first sub-signal of the first signal;
    a temporal differential detector, communicatively coupled to the sync signal detector, that determines a time shift based at least on part on the detected synchronization signal; and
    a timing adjustment sub-module, communicatively coupled to the temporal differential detector, that adjusts timing of at least one of the first and second signals according to the determined time shift.

21. The system of claim 15, wherein the timing differential module comprises:
- a sync signal detector that detects when a predetermined characteristic of the second sub-signal of the first signal occurs; and
- a timing differential detector, communicatively coupled to the sync signal detector, that determines relative timing between the respective second sub-signals based at least in part on information of when the predetermined characteristic of the second sub-signal of the first signal occurs.

22. The system of claim 15, wherein the timing differential module receives information of a third sub-signal of the first signal and determines relative timing between the respective second sub-signals based at least in part on a known temporal relationship between the second sub-signal of the first signal and the third sub-signal of the first signal.

23. The system of claim 15, wherein the output signal indicative of signal consistency comprises a signal indicative of the relative timing between the respective second sub-signals of the synchronized first and second signals.

24. The system of claim 15, wherein the output module comprises:
- a comparator sub-module that compares the relative timing determined by the timing differential module to a threshold; and
- an output sub-module, communicatively coupled to the comparator sub-module, that outputs a signal indicative of signal consistency based at least in part on the threshold comparison.

25. The system of claim 15, wherein the output module comprises:
- a statistical analysis sub-module that statistically analyzes the relative timing determined by the timing differential module and at least one other relative timing determined by the timing differential module; and
- an output sub-module, communicatively coupled to the statistical analysis sub-module, that outputs a signal indicative of signal consistency based at least in part on the statistical analysis.

26. The system of claim 15, wherein the signal synchronization module, timing differential module, and output module are modules of a single integrated circuit.

27. A signal processing system comprising:
- a receiver module that receives a first signal and a second signal, each of the first signal and the second signal comprising a first sub-signal and a second sub-signal;
- a first sub-system, communicatively coupled to the receiver module, that generates a signal indicative of signal consistency, the first sub-system comprising:
  - a signal synchronization module that temporally synchronizes the first and second signals by adjusting the timing of at least one of the first and second signals, the signal synchronization module determining a timing adjustment based, at least in part, on the first sub-signal of the first signal and the first sub-signal of the second signal;
  - a timing differential module, communicatively coupled to the signal synchronization module, that receives information of the temporally synchronized first and second signals and determines relative timing between the respective second sub-signals of the temporally synchronized first and second signals; and
  - an output module, communicatively coupled to the timing differential module, that outputs a signal indicative of signal consistency based, at least in part, on the relative timing determined by the timing differential module;
- a signal processing module, communicatively coupled to the first sub-system, that performs signal processing on at least one of the first and second signals, the signal processing being based, at least in part, on the signal indicative of signal consistency; and
- an output module, communicatively coupled to the signal-processing module, that outputs a signal indicative of the results of the signal processing performed by the signal-processing module.

28. The signal processing system of claim 27, wherein the output module outputs the signal indicative of the results of the signal processing to a system capable of converting the signal indicative of the results of the signal processing to a human-perceivable signal.

29. The signal processing system of claim 27, wherein the output module outputs a human-perceivable signal indicative of the results of the signal processing performed by the signal-processing module.

* * * * *